(12) United States Patent
Shimodaira

(10) Patent No.: US 8,139,862 B2
(45) Date of Patent: Mar. 20, 2012

(54) CHARACTER EXTRACTING APPARATUS, METHOD, AND PROGRAM

(75) Inventor: Masato Shimodaira, Tokyo (JP)

(73) Assignee: Keyence Corporation, Osaka (JP)

( * ) Notice: Subject to any disclaimer, the term of this patent is extended or adjusted under 35 U.S.C. 154(b) by 1195 days.

(21) Appl. No.: 11/898,627

(22) Filed: Sep. 13, 2007

(65) Prior Publication Data
US 2008/0063272 A1    Mar. 13, 2008

(30) Foreign Application Priority Data

Sep. 13, 2006 (JP) ................................. 2006-248368
Aug. 24, 2007 (JP) ................................. 2007-218699

(51) Int. Cl.
G06K 9/38 (2006.01)
G06K 9/34 (2006.01)

(52) U.S. Cl. .................... 382/182; 382/172; 382/177

(58) Field of Classification Search .......... 382/168–189, 382/254, 270, 190, 192, 194, 232, 273, 195, 382/199, 209, 276, 282; 358/448, 462, 464, 358/1.1, 1.9, 2.1, 1.11, 1.2, 1.18
See application file for complete search history.

(56) References Cited

U.S. PATENT DOCUMENTS

| | | | | |
|---|---|---|---|---|
| 5,825,920 A | * | 10/1998 | Kitamura et al. | 382/178 |
| 6,535,619 B1 | * | 3/2003 | Suwa et al. | 382/101 |
| 7,003,159 B2 | * | 2/2006 | Yamaai | 382/199 |
| 7,047,238 B2 | * | 5/2006 | Tada et al. | 1/1 |
| 7,142,716 B2 | * | 11/2006 | Katsuyama et al. | 382/190 |
| 2004/0213444 A1 | * | 10/2004 | Yamamichi | 382/128 |

FOREIGN PATENT DOCUMENTS

| | | |
|---|---|---|
| JP | 6-52355 A | 2/1994 |
| JP | 6-215181 A | 8/1994 |
| JP | 2872768 B | 1/1999 |

* cited by examiner

*Primary Examiner* — Sheela Chawan
(74) *Attorney, Agent, or Firm* — Smith Patent Office

(57) ABSTRACT

The present invention provides a technique of accurately extracting areas of characters included in a captured image even in a case where noise or dirt of a relatively large area occurs in a background image. An integrated pixel value is obtained by integrating pixel values in a character extracting direction B for pixel positions in a character string direction A of an image including a character string. A standard deviation value is calculated along the character extracting direction for pixel positions in a character string direction A. The integrated pixel value and the standard deviation value are combined for pixel positions in a character string direction A. A threshold is set automatically or manually. A part of pixel positions in a character string direction A having the combined value of the integrated pixel value and the standard deviation value higher than the threshold is recognized as a character area to be extracted.

21 Claims, 19 Drawing Sheets

622 — Scanning

62C

Standard deviation

CHARACTER EXTRACTING APPARATUS, METHOD, AND PROGRAM

BACKGROUND OF THE INVENTION

1. Field of the Invention

The present invention relates to a technique for extracting a character area from a captured image.

2. Description of the Related Art

By capturing an image of characters printed on a commodity or product with an image acquisition device, for example, a two dimensional image acquisition device using a CCD, CMOS or the like, and performing a character recognizing process in an image processing apparatus, a process of recognizing the print can be automated.

To perform the character recognizing process with high precision, a character extracting process as a pre-process of the character recognizing process is important in the image processing apparatus.

The character extracting process is a process of determining a character area included in a captured image. In a case where a captured image includes a character string made of a plurality of characters, each of the character areas corresponding to each character in the character string has to be determined from the character string.

One of the methods of extracting a character string is a method utilizing projection data of an image. Specifically, waveform data obtained by integrating pixel values of a captured image in an extraction direction is generated and analyzed. A fact is utilized that a pixel integration value of a character part is larger than that in a background part (in a case where a character is black, it is sufficient to make the pixel integration value of the character part large by reversal), and an area in which the pixel integration value exceeds a predetermined threshold is recognized as a character area.

FIG. 18 is a diagram showing an image 90 of a medium on which characters "T60" are printed and waveform data 91 generated from the image 90. The waveform data 91 are data obtained by integrating pixel values in a character extracting direction Y at a coordinate position in a character string direction X of the image 90. For easier explanation, the waveform data 91 and the image 90 including the characters "T60" are shown so as to be aligned in the character string direction X. It is understood from the figure that the pixel integration values of the character portions are larger than the pixel integration values of the background part. Therefore, as shown in FIG. 18, by setting a threshold 92 shown in the figure, it is able to determine that areas having pixel value integration values above the threshold 92 are areas corresponding to characters to be extracted from the character string.

When characters to be extracted in the acquisitioned image have clear contrast with a background in the image or there is no pattern or dirt in the background of the image, it is relatively easy to extract the character area precisely as described with FIG. 18.

However, when characters to be extracted in the acquisitioned image have unclear contrast with a background in the image or there is dirt or a rough surface like a random noise in the background of the image, it is more difficult to extract the character area.

FIG. 19 shows an image 93 of a medium on which characters "T60" and waveform data 94 generated from the image 93. The character "T60" of the image 93 has a low contrast against a background and the background has random noise. In such a case, when a threshold 95 is set in the same manner as the threshold 92 set in the waveform shown in FIG. 18, as shown in FIG. 19, there is a possibility to make a mistake in recognition of the character area. For example, since each area corresponding to a transverse line part of the "T" character and a center area of the "O" character have relatively small pixel value integration values as compared with the other area of each character and also have a relatively small difference of the pixel value integration values to the pixel value integration values of the background, it is possible that it is not able to recognize an appropriate character area.

Japanese Patent Publication No. 2,872,768 discloses a method of setting a search start point and a search end point in an image, integrating pixel values of pixels passing a path connecting the start and end points, and finding a path in which the integration value is the minimum. According to the method, although a character area can be extracted accurately, a search start point, a search end point, and a search area connecting the points have to be set in advance. That is, the method can be executed on the condition that a character boundary area can be predicted to some extent.

SUMMARY OF THE INVENTION

In view of the above problems in the conventional technologies, an object of the present invention is to provide a technique of accurately extracting areas of characters included in a captured image even in a case where the contrast of the character to be extracted is lower against the background of the image or random noise occurs in a background image.

In order to achieve this and other objects, according to a first aspect of the present invention, there is provided an apparatus for extracting each character from a character string having a plurality of characters arranged in a first direction and included in an image. The apparatus comprises an integrating device integrating pixel values along a second direction orthogonal to the first direction for all coordinate positions in the first direction of the image; a calculating device calculating a standard deviation value of pixel values along the second direction for all coordinate positions; a combining device combining the integrated pixel value of the integrating device with the standard deviation value of the calculating device for all coordinate positions; a setting device setting a threshold; and a determining device determining parts of all coordinate positions having the combined value higher than the threshold of the setting device and recognizing the part having the combined value higher than the threshold of the setting device as a character area to be extracted.

In order to achieve the above and other objects, according to a second aspect of the present invention, there is provided a method for extracting each character from a character string having a plurality of characters arranged in a first direction and included in an image. The method comprises the steps of: integrating pixel values along a second direction orthogonal to the first direction for all coordinate positions in the first direction of the image; calculating a standard deviation value of pixel values along the second direction for all coordinate positions; combining the integrated pixel value of said step of integrating with the standard deviation value of said step of calculating for all coordinate positions; and determining parts of all coordinate positions having the combined value of said step of combining higher than a predetermined threshold and recognizing the part having the combined value higher than the threshold as a character area to be extracted.

In order to achieve the above and other objects, according to a third aspect of the present invention, there is provided a computer readable medium including a program for extracting each character from a character string having a plurality of characters arranged in a first direction and included in an image. The program includes an integrating device integrating pixel values along a second direction orthogonal to the first direction for all coordinate positions in the first direction of the image; a calculating device calculating a standard deviation value of values related to pixel values along the second direction for all coordinate positions; a combining device combining the integrated pixel value of the integrating device with the standard deviation value of the calculating device for all coordinate positions; a setting device setting a threshold; and a determining device determining parts of all coordinate positions having the combined value of the combining device higher than the threshold of the setting device and recognizing the part having the combined value higher than the threshold of the setting device as a character area to be extracted.

The character extracting apparatus of the invention calculates a pixel value integration evaluation value in a direction of extracting an image including characters, and sets an area in which an evaluation value exceeds a first threshold as a character candidate area. Whether the character candidate area is a noise component or not is determined by using a second threshold. Therefore, even noise whose density is not so different from the background but having a relatively wide area and having a size close to that of a character can also be accurately eliminated.

Since noise is eliminated by using the second threshold provided separately from the first threshold without operating the first threshold for extracting characters, an adverse influence is not exerted on the area of a character extracted.

DETAILED DESCRIPTION OF THE PREFERRED EMBODIMENTS

Outline of the System

Figure 1:
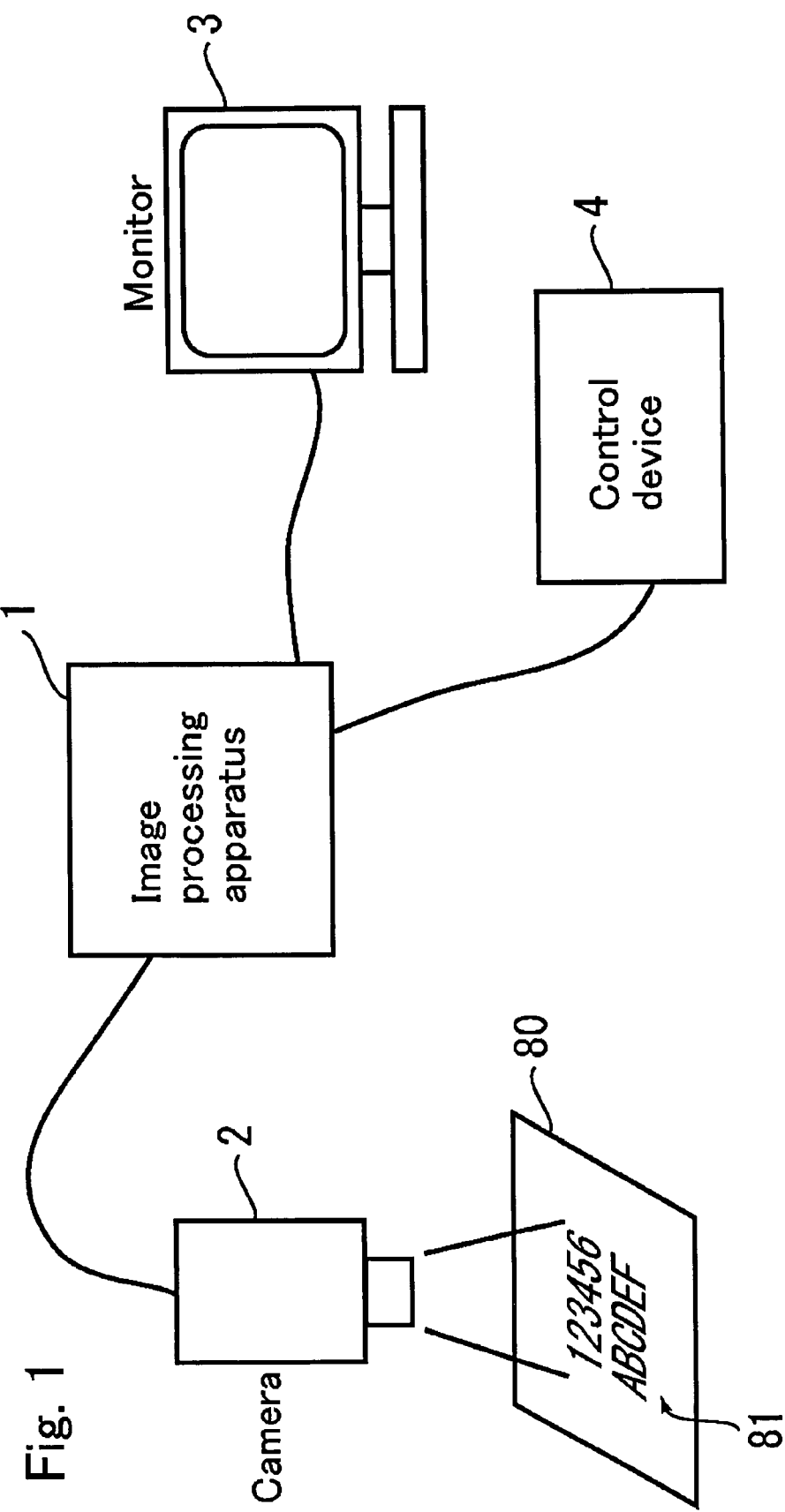
FIG. 1 is a general view of an image processing system according to an embodiment of the invention.

An embodiment of the present invention will be described below with reference to the drawings. FIG. 1 is a general view of an image processing system of an embodiment. The image processing system has an image processing apparatus 1, a camera 2, and a monitor 3. The camera 2 has an imaging sensor such as a CCD or CMOS and an optical unit. As the monitor 3, for example, a liquid crystal display is used. The image processing apparatus 1 is connected to a control device 4 controlled by a process of the image processing system.

In the image processing system, an image of characters 81 printed on a medium 80 is captured by the camera 2, and the image processing apparatus 1 analyzes the image captured by the camera 2. An analysis result and process data are properly displayed on the monitor 3. When characters are finally recognized from the captured image in the image processing apparatus 1, the control device 4 is controlled in accordance with the recognition result.

The medium 80 on which the characters 81 are printed may be, for example, a medium adhered on a product or a package itself of an article. The image processing apparatus 1 recognizes the characters 81 printed on the product or article, thereby performing a task of checking a product/article manufacturing process, a conveying process, or the like.

Figure 2:
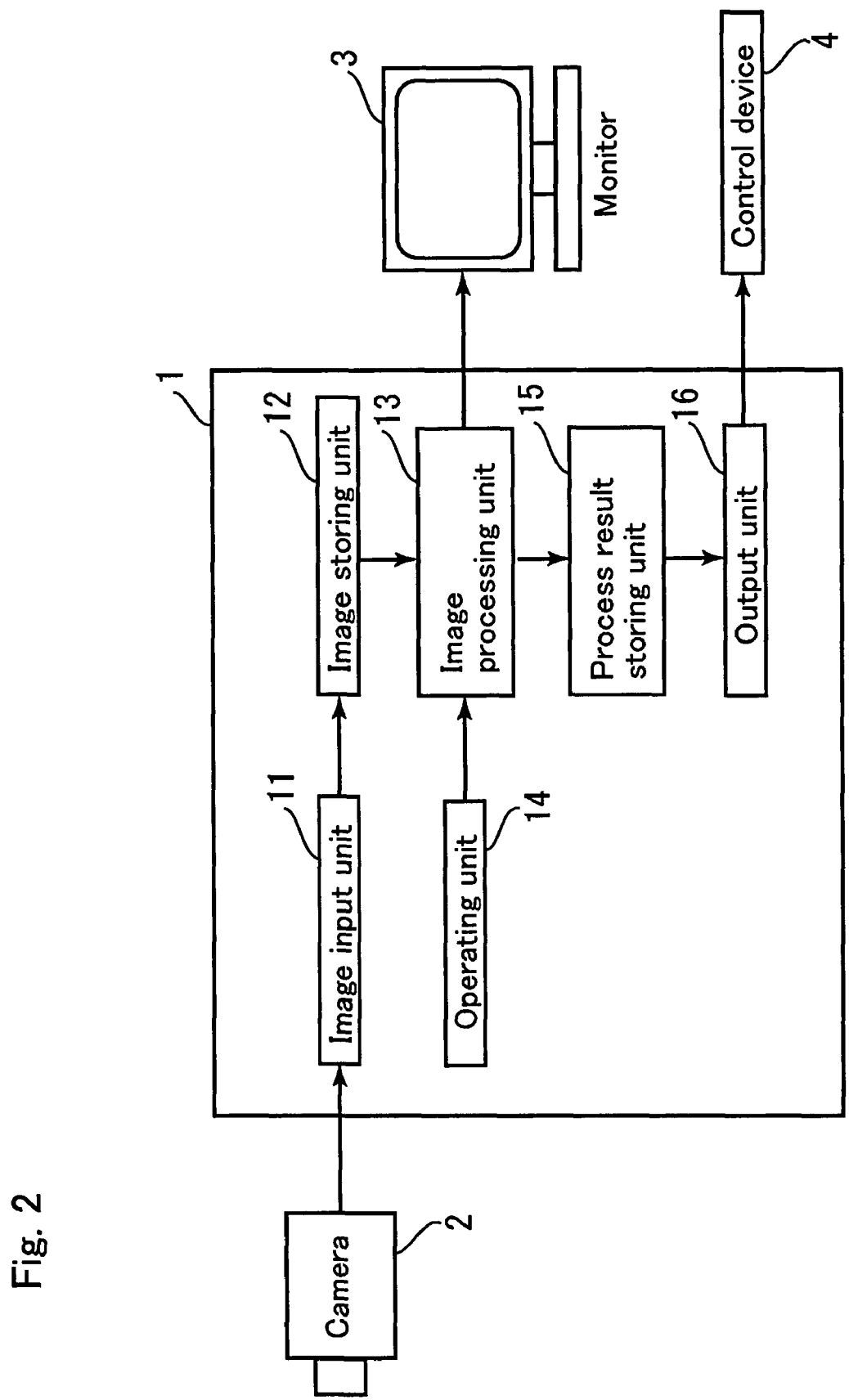
FIG. 2 is a block diagram of an image processing apparatus.

FIG. 2 is a diagram showing functional blocks of the image processing apparatus 1. The image processing apparatus 1 has, as shown in the figure, an image input unit 11, an image storing unit 12, an image processing unit 13, an operating unit 14, a process result storing unit 15, and an output unit 16.

An image captured by the camera 2 is input to the image processing apparatus 1 by way of the image input unit 11 and once stored in the image storing unit 12. The image-processing unit 13 executes a process of extracting each character from the captured image stored in the image storing unit 12 and a character recognizing process corresponding to each character. The character extracting process characterizes the present invention, and the details of the character extracting process will be described later. For the character recognizing process, a known method is used. The character recognition result is stored in the process result storing unit 15. The process result data is output to the outside by the output unit 16 and, for example, the control device 4 is controlled according to the process result data.

The image processing apparatus 1 also has the operating unit 14. The operating unit 14 is constructed of, for example, dials, key buttons, and the like. By operating the operating unit 14, the user can provide various instructions to the image processing apparatus 1. For example, parameters of the image processing and the like can be set. On the monitor 3, a screen for setting process parameters, for showing a process result, and the like are displayed. By referring to the screen displayed on the monitor 3, the user sets the parameters and recognizes the process result.

Character Extracting Method

Referring now to FIG. 3, the character extracting method of the present invention will be described. The character extraction step is a preprocessing step of recognizing characters included in a captured image and is a process of extracting the area of each of the characters included in a character string in a captured image. In the character extracting process, a line including the character string is extracted from the captured image and each of the characters of the character string is extracted from the character string. Since the present invention characterizes a process of the character extracting from the character string, it will be explained in more detail to a process after the character string extraction process.

Figure 3A:
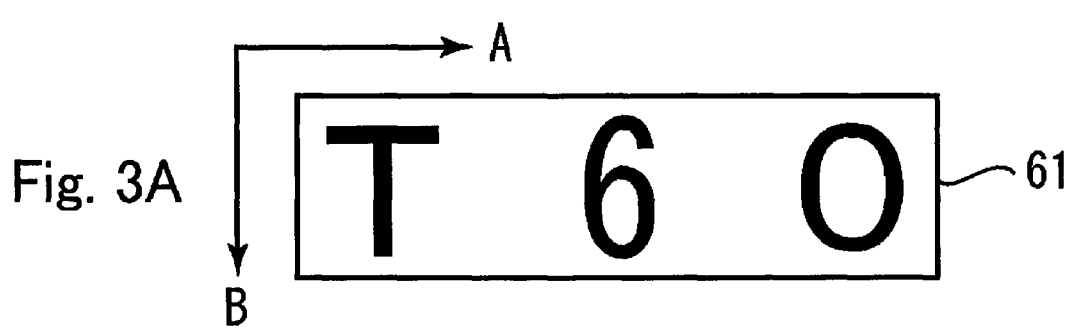
FIGS. 3A through 3D are diagrams showing the procedure of the character extracting step.

FIG. 3A is a diagram showing an image 61 of a line (a character string) extracted. In the other words, the image 61 includes the character string to be extracted. A size of a rectangular shaped window to surround all the character string to be extracted is automatically decided based on the following conditions. A width of the rectangular shaped window is decided by an extraction starting character's position and an extraction ending character's position in an extraction direction. For example, when the extraction direction is from the left side to the right side in FIG. 3A, the extraction starting character's position is the most left side positioning part of the "T" character and also the extraction ending character's position is the most right side positioning part of the "0" character. Based on this position information, the width of the rectangular shape window is decided. Further, these extraction starting and ending characters positions are decided by using integrated pixel values along a second direction orthogonal to the character string arrangement direction A for all coordinate positions in the character string arrangement direction A of the image.

Furthermore, a height of the rectangular shape window is decided by positions of the highest part and the lowest part of all the characters included the character string to be extracted. Based on the above extraction condition of the character string, the image 61 includes a character string "T60" as shown in FIG. 3A.

Directions A and B are defined as shown in the figure. The direction A will be called a character string direction A, and the direction B will be called a character extracting direction B. The direction A can be also called a line extracting direction A indicating an arrangement direction of the character string to be extracted. As shown in the figure, the direction A is orthogonal to the direction B. In the other words, the direction B is defined to be orthogonal to the direction A, after the character string is extracted. That is, the image 61 is an image having character string including a plurality of characters and extracted in the line extracting direction A from the captured image and, in a following process, extraction in the character extracting direction B is performed, thereby extracting character areas corresponding to each character from the image 61.

Figure 3B:
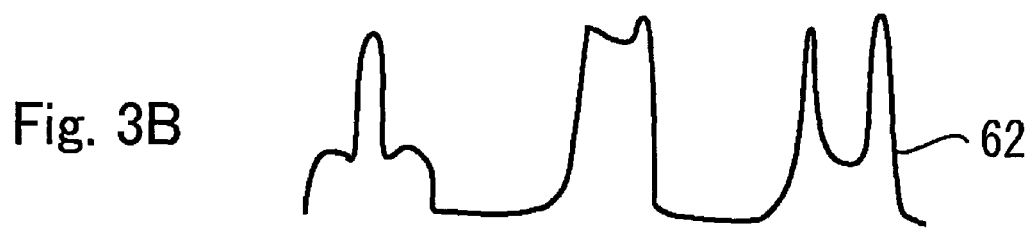

FIG. 3B is a diagram showing a pixel value integration evaluation value obtained by integrating pixel values in the character extracting direction B of the image 61 at each coordinate position in a character string direction A.

A pixel value integration evaluation value is calculated for the pixel positions (coordinate positions) in the character string direction A and expressed as waveform data 62. The waveform data 62 is used as data for evaluating a character area. That is, different from the background part, in the area in which a character exists, the pixel value integration evaluation value is large, and the character area can be evaluated.

To largely express the waveform data 62 in the character areas, in a case where characters are in black, the characters are reversed, and the pixel value integration evaluation value is obtained. That is, the image 61 is a monotone image in which the pixel value (density) is, for example, 0 to 255. In the case where the background is black and the character color is white, the character part has a high brightness. Consequently, it is sufficient to use a value obtained by integrating pixel values as a pixel value integration evaluation value. When the background is white and the character color is black, the character part has a low brightness. Consequently, the pixel values 0 to 255 are converted to pixel values 255 to 0. A value obtained by integrating the reversed pixel values is employed as a pixel value integration evaluation value. Therefore, irrespective of the character color, which is black or white, the character part can be handled in the same manner so that the pixel value integration evaluation value becomes large.

As described to the above, the integrated pixel values in the character extracting direction at each pixel position in the character string direction is adopted as the pixel value integration value. However, it is also preferred that a result value is a moving minimum value subtracted from the pixel value integration value or a moving average value is subtracted from the pixel value integration value. The method using these moving minimum or average values for calculating the other type of pixel value integration value will be described later in more detail.

Figure 3C:

FIG. 3C shows a diagram showing a pixel value variance evaluation value indicating a variance degree of the pixel value in the image 61 in the character extracting direction B. At each pixel position (each coordinate position) in the character string direction A, a standard deviation of the pixel along the character extracting direction B is calculated and a waveform 63 indicates these standard deviations. Accordingly, the waveform 63 is a waveform for evaluating the extracted character area from the other perspective. In the other words, at an area having a character different from the other area having the background, an evaluation is carried out for the character area by using the larger of the variance of the pixel values. Further, in this embodiment of the present invention, in addition to the above-mentioned standard deviation along the character extracting direction B, it is also preferred to use a standard deviation of a differential image corresponding to the image 61, a standard deviation of the pixel differential value of the differential image as the pixel value variance evaluation value or a combined variance evaluation value based on the above three types of pixel value variance evaluation values. The methods based on the three types of the pixel value variance evaluation values will be explained in more detail later.

Figure 3D:
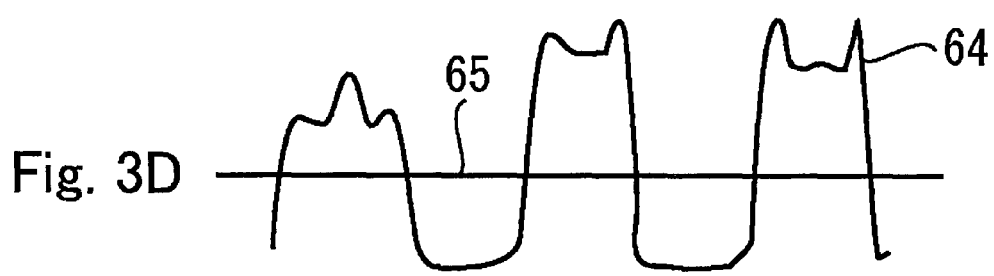

FIG. 3D shows a combined waveform data 64 with the pixel value integration evaluation value shown in FIG. 3B and the pixel value variance evaluation value shown in FIG. 3C. Namely, the combined waveform data 64 is data at each pixel position in the character string direction A, indicating a total evaluation value adding the pixel value integration evaluation value to the pixel value variance evaluation value. A method of the combination of these values is simply to add the pixel value integration evaluation value to the pixel value variance evaluation value or to combine these values by adjusting a ratio between these values as an assigning weight between these values.

Flow of the Processes

Figure 4:
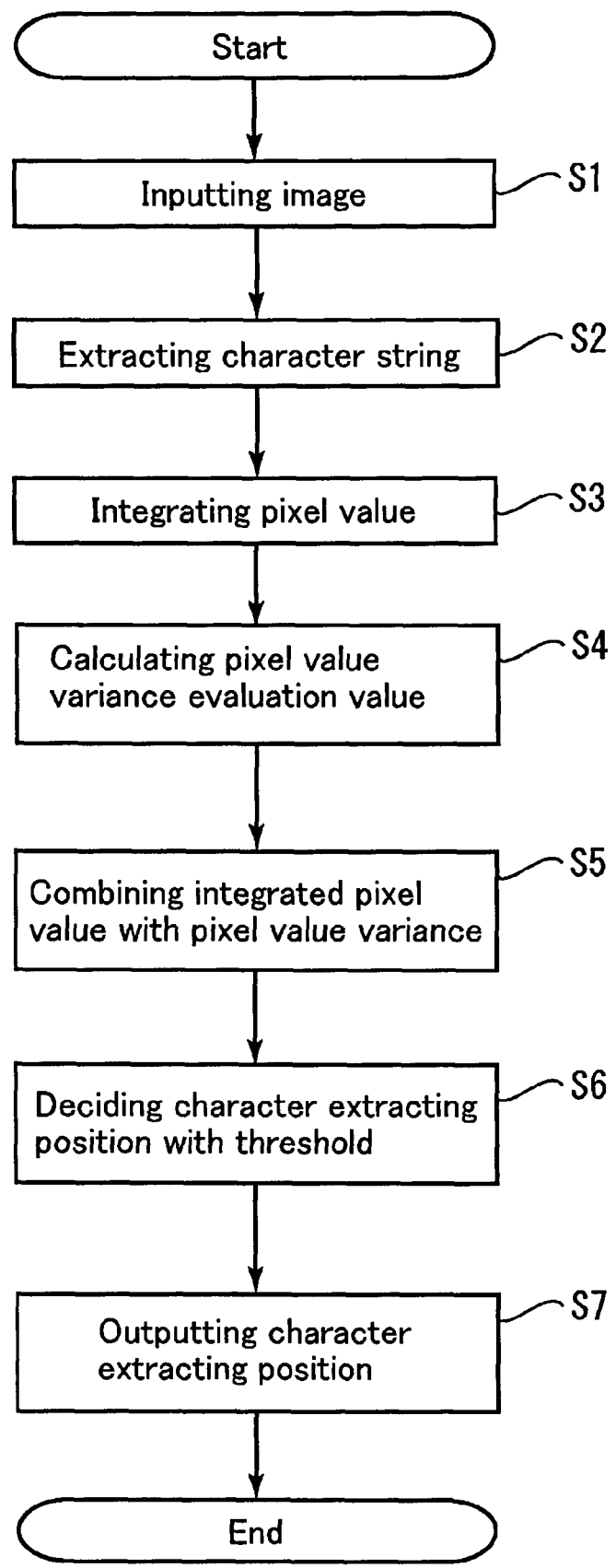
FIG. 4 is a general flowchart of the character extracting process.
Figure 5:
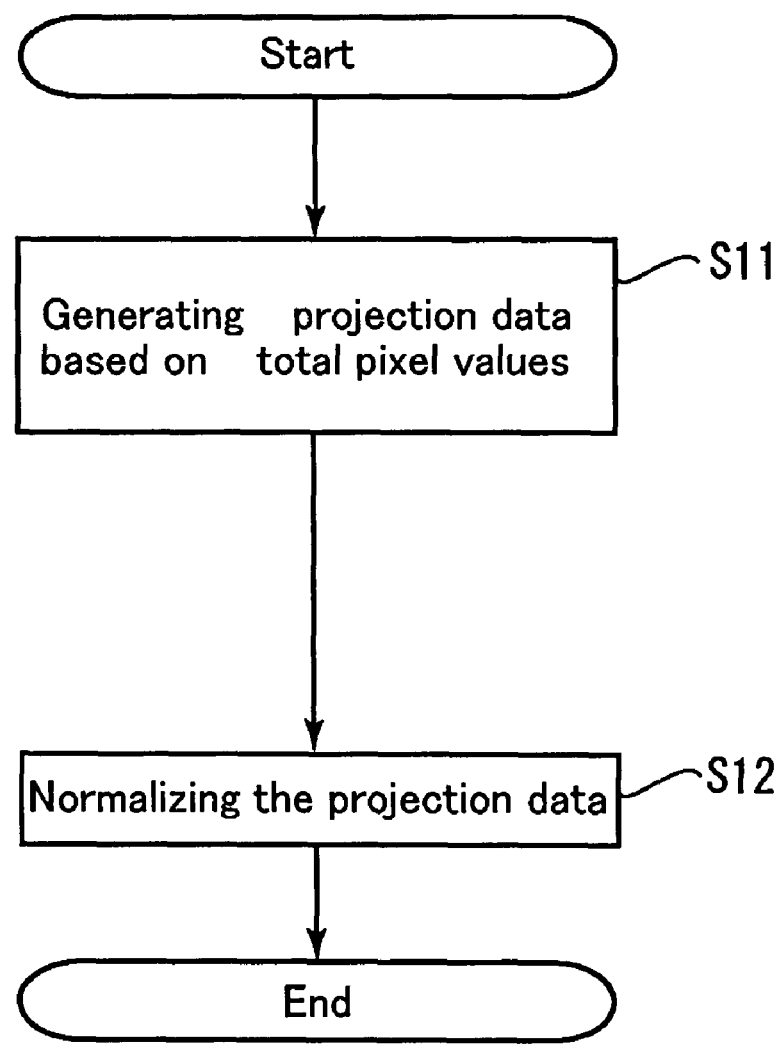
FIG. 5 is a flowchart showing a first embodiment for calculating the pixel value integration value.
Figure 6:
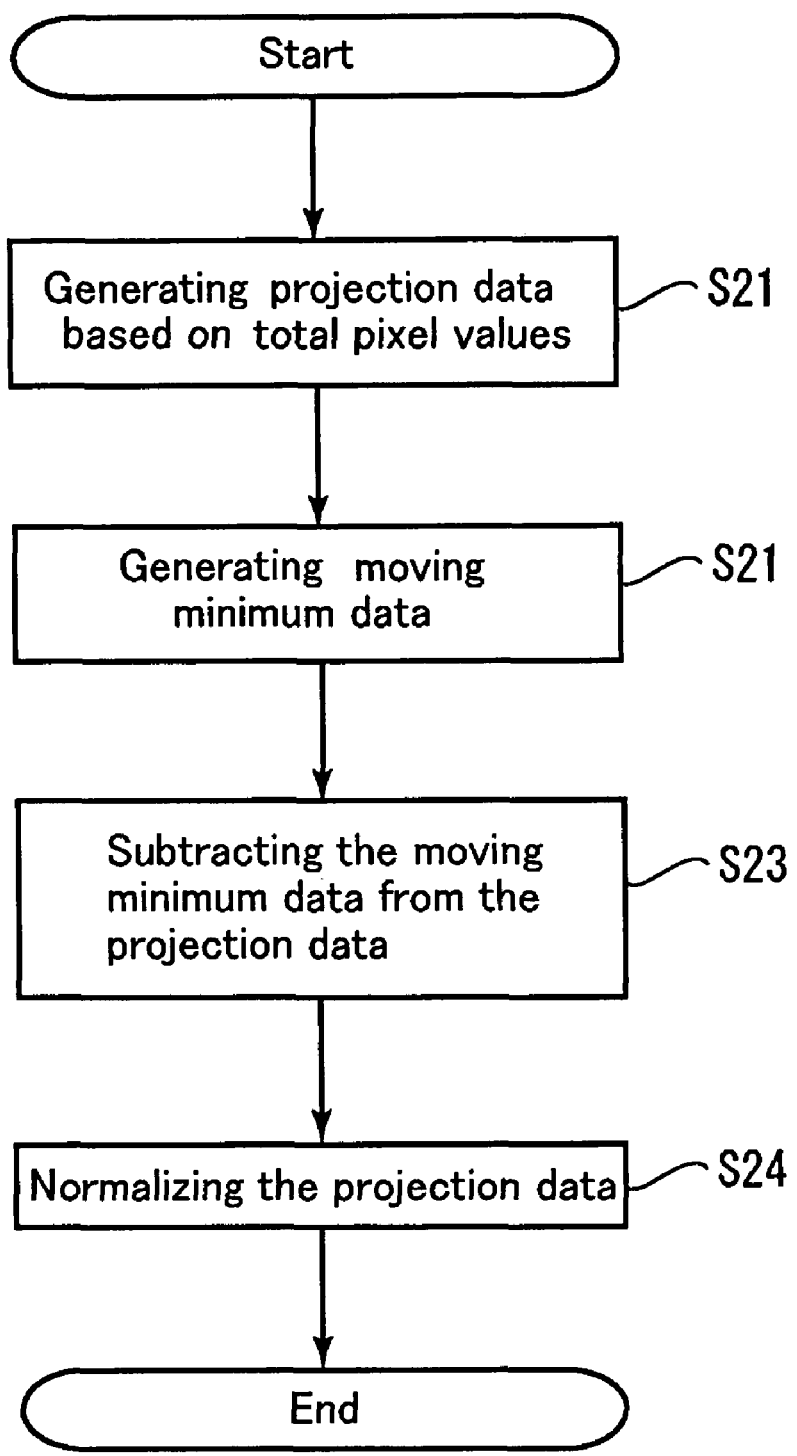
FIG. 6 is a flowchart showing a second embodiment for calculating the pixel value integration value.
Figure 7A:
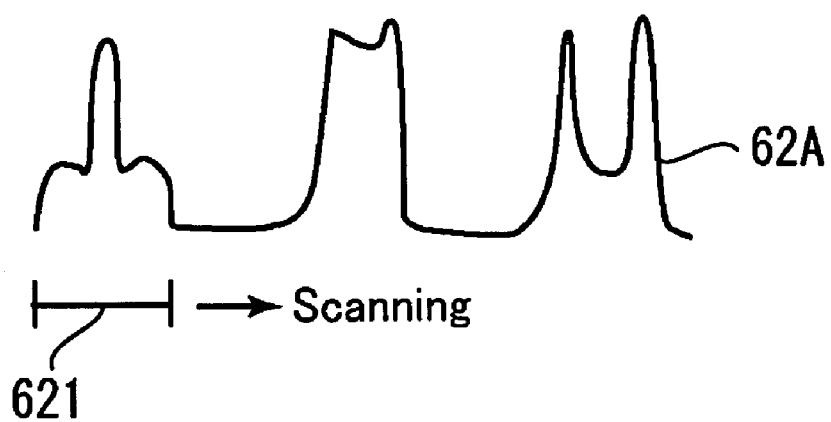
FIGS. 7A and 7B are diagrams showing the second embodiment for calculating the pixel value integration value.
Figure 7B:
Figure 8:
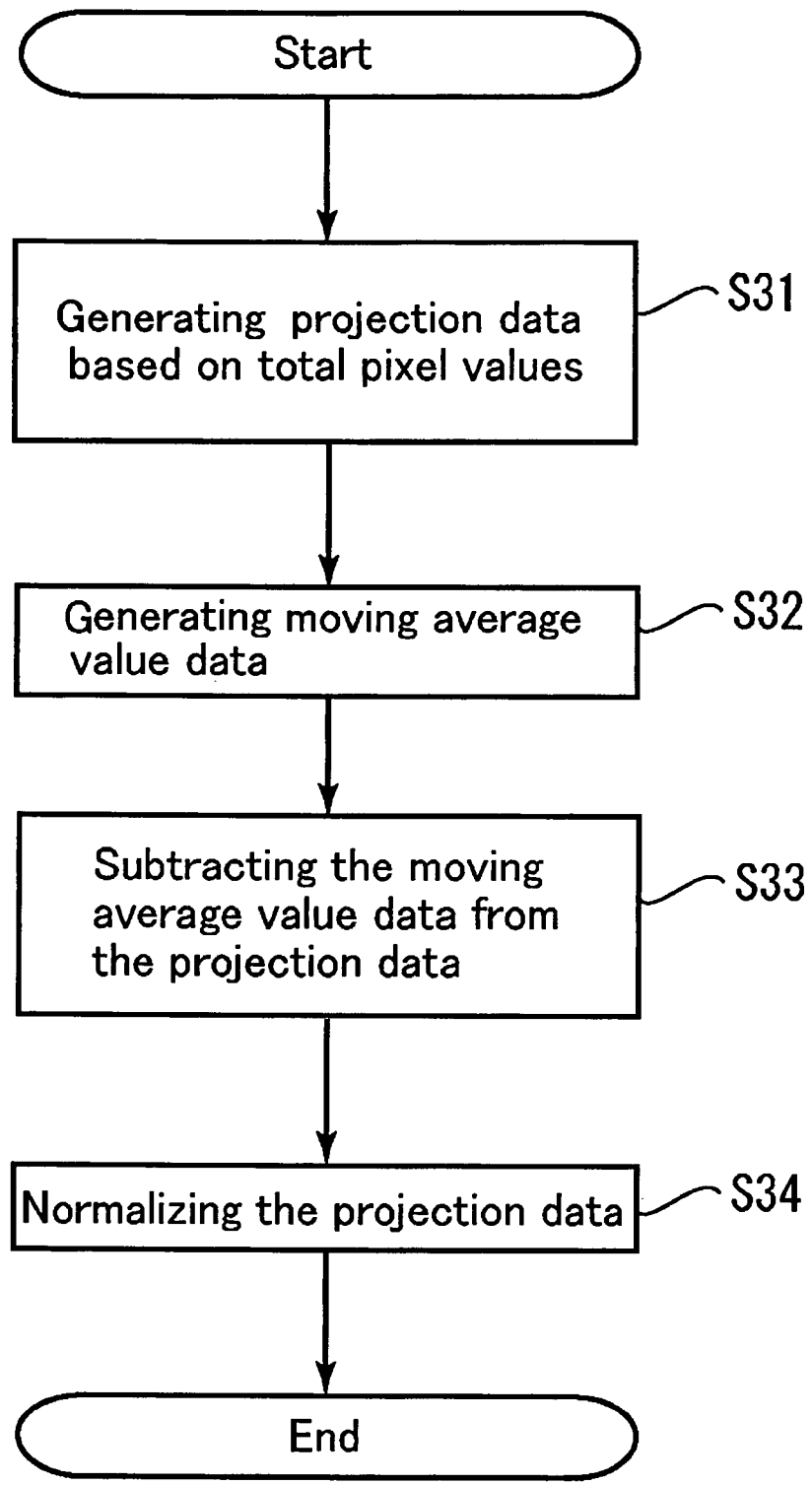
FIG. 8 is a flowchart showing a third embodiment for calculating the pixel value integration value.
Figure 11:
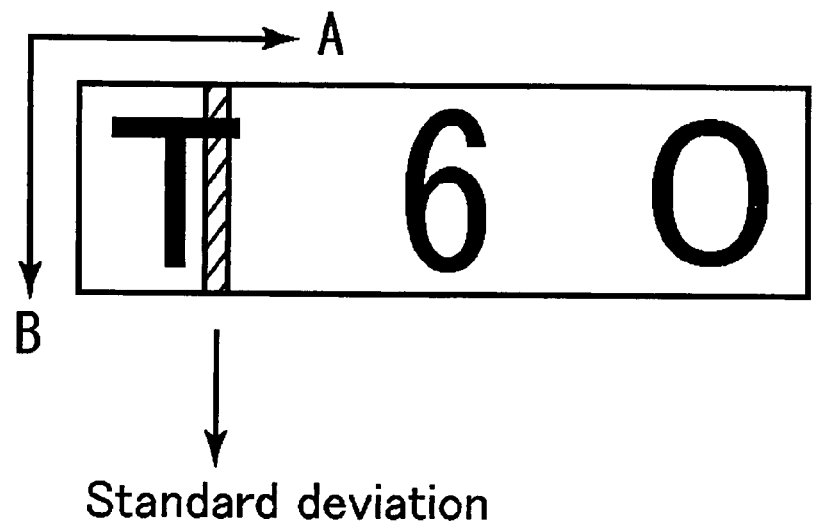
FIG. 11 is a diagram showing the first embodiment for calculating the pixel value variance evaluation value.
Figure 12:
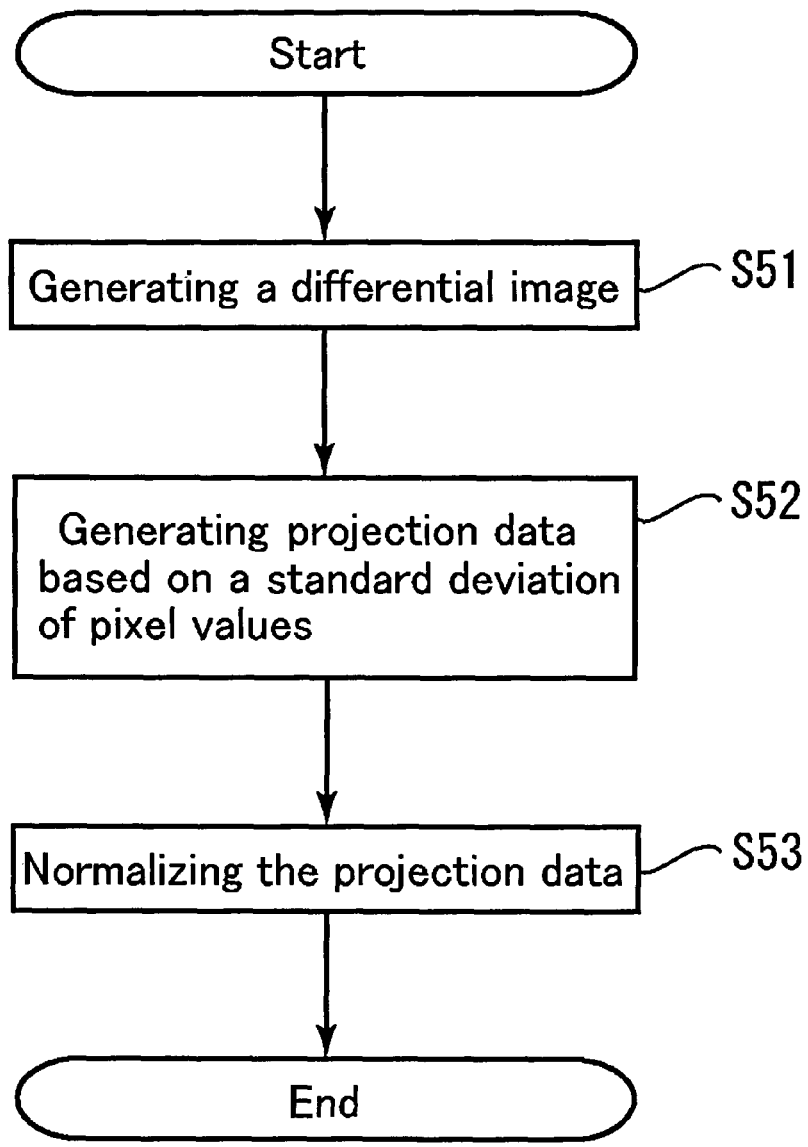
FIG. 12 is a flowchart showing a second embodiment for calculating the pixel value variance evaluation value.
Figure 13:
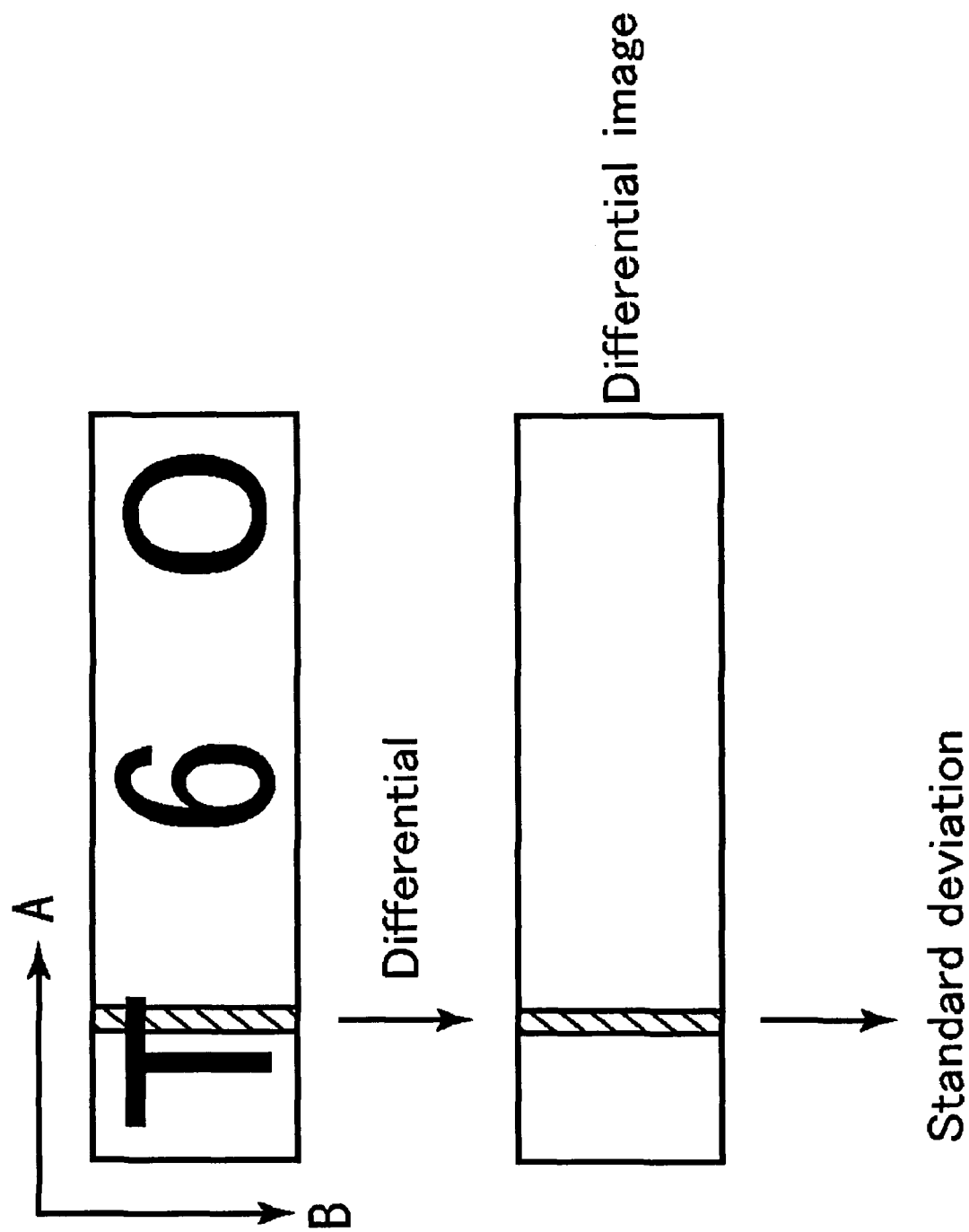
FIG. 13 is a diagram showing the second embodiment for calculating the pixel value variance evaluation value.
Figure 14:
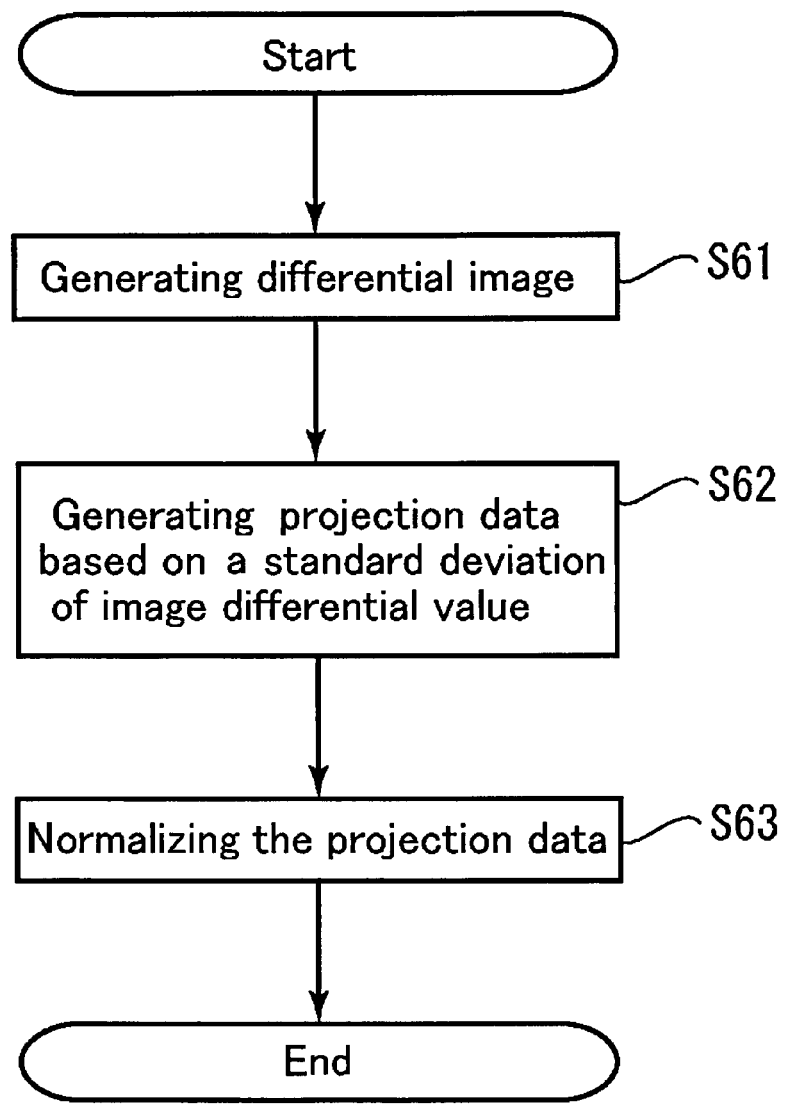
FIG. 14 is a flowchart showing a third embodiment for calculating the pixel value variance evaluation value.
Figure 15:
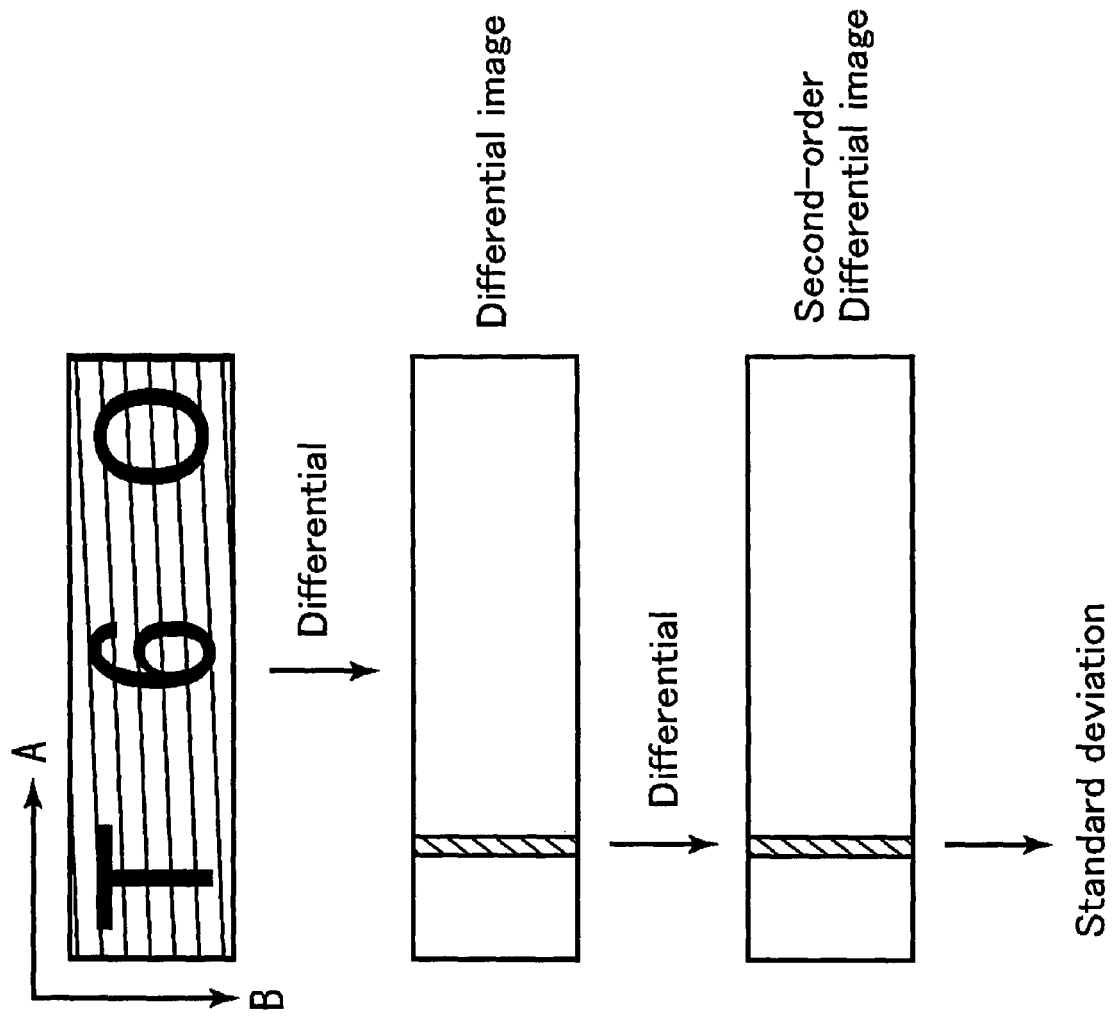
FIG. 15 is a diagram showing the third embodiment for calculating the pixel value variance evaluation value.
Figure 16:
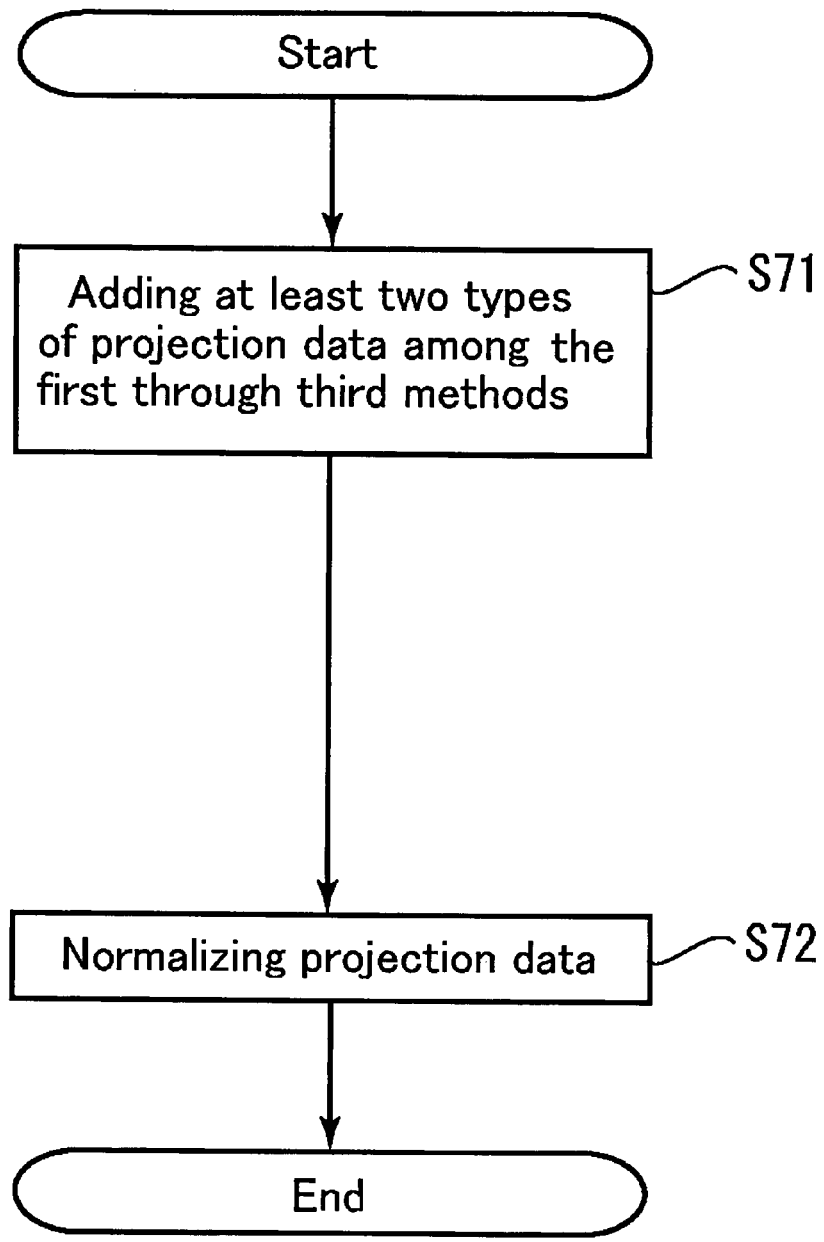
FIG. 16 is a flowchart showing a fourth embodiment for calculating the pixel value variance evaluation value.

A flow of the character extracting process will be explained referring to FIG. 4 through FIG. 16. FIG. 4 shows a flowchart of the character extracting process. Further, each of FIG. 5, FIG. 6 and FIG. 8 is a flowchart for a detailed explanation to calculate the pixel value integration evaluation value as a part of the flowchart shown in FIG. 4. Furthermore, each of FIG. 12, FIG. 14 and FIG. 16 is a flowchart for a detailed explanation to calculate the pixel value variance evaluation value as a part of the flowchart shown in FIG. 4.

Referring to the whole process flow in FIG. 4, the image of the character 81 printed on the medium 80 is captured by the camera 2. The captured image is input to the image input unit 11 and is stored in the image-storing unit 12 (Step S1). The following processes from Step S2 are the image processing steps by the image-processing unit 13. At Step 2, the image-processing unit 13 inputs the captured image and executes the character string extraction. Namely, this is carried out in the image processing unit 13 to extract areas where the character string exists and an image corresponding to the character string to be extracted along the line extracting direction A. The extracted image corresponds to the image 61 shown in FIG. 3A. As the next step, at Step S3, the image-processing unit 13 calculates the pixel value integration evaluation value. Namely, the image-processing unit 13 calculate the pixel value integration evaluation value at each pixel position (each coordinate position) along the character string direction B. Thus, the calculated pixel value integration evaluation value is shown in the waveform data 62 in FIG. 3B. In this embodiment of the present invention, as described above, it is adopted to one of three methods shown in the flowcharts in FIG. 5, FIG. 6 and FIG. 8, respectively.

At first, a first method for calculating the pixel value integration evaluation value will be explained with reference to FIG. 5. At Step S11, projection data is generated based on total pixel values corresponding to each pixel position along the character extracting direction B. Namely, the pixel value integration evaluation value is calculated at each pixel position in the character string direction A based on integrating pixel values along the character extracting direction B which is orthogonal to the direction A. Then at Step S12, the calculated projection data is normalized. Normalizing means a process to adjust a range of the evaluation values to match the maximum value of the calculated pixel value integration evaluation value to a predetermined value. A first method to achieve the normalizing process adopts the integration value of the pixel values as the pixel value integration evaluation value.

FIG. 6 shows a flowchart indicating a second method for calculating the pixel value integration evaluation value. At Step S21, a projection data is generated based on total pixel values corresponding to each pixel position along the character extracting direction B. Namely, the pixel values along the character extracting direction B are integrated at each pixel position (coordinate position) in the character string direction A. Thus, the calculated integration values are shown a waveform 62A shown in FIG. 7A.

At Step S22, the moving minimum data is generated. As shown in FIG. 7A, a scan section 621 is shifted to the character string direction A corresponding to the waveform 62A generated at Step S21 and at each shifted position along the direction A, the minimum value of the pixel integration value is calculated within the shifted scan section. Thus, the calculated minimum values are shown as a waveform 62B shown in FIG. 7B.

At Step S23, at each pixel position in the character string direction A, the waveform data 62B as the moving minimum value data is subtracted from the waveform data 62A as the projection data. Then, the calculated evaluation data subtracting the moving minimum value data from the projection data is normalized at Step S24. The normalizing process is the same as the above described at Step S12. The second method to achieve the normalizing process adopts the evaluation value subtracting the moving minimum value data from the projection data as the pixel value integration evaluation value. When the second method is adopted, a shading effect caused by lens characteristics of the image acquisition device, like the camera 2 or an illumination device (not shown) for illuminating the image character 81 from the specified illuminating direction and variations of light intensity occurring in the captured image can be removed and then it can be adjusted to provide a clear difference between the pixel value integration evaluation values of the character area and the background area.

Figure 9A:
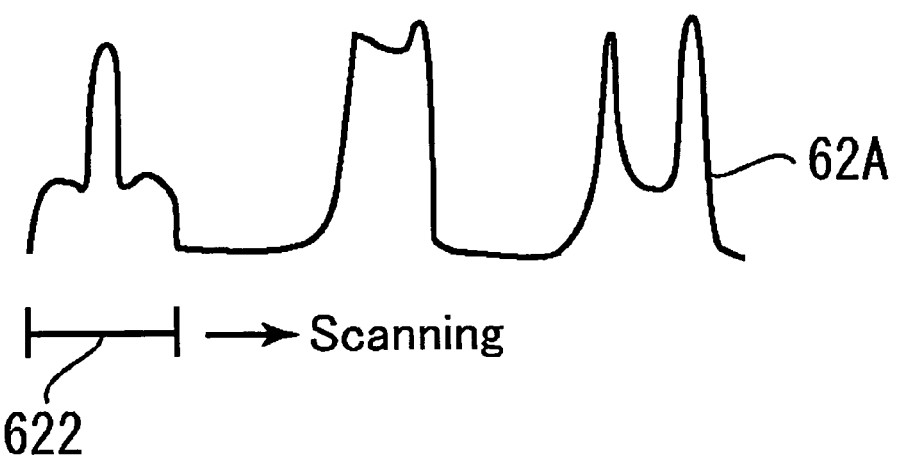
FIGS. 9A and 9B are diagrams showing the third embodiment for calculating the pixel value integration value.
Figure 9B:

FIG. 8 shows a flowchart indicating a third method to achieve the normalizing process. At Step S31, projection data are generated based on total pixel values corresponding to each pixel position along the character extracting direction B. Namely, the pixel values are integrated along the character extracting direction B at each pixel position (coordinate position) in the character string direction A. Thus, the calculated integration values are shown in the waveform 62A shown in FIG. 9A. Next, at Step S32, moving average value data are generated. As shown in FIG. 9A, a scan section 622 is shifted in the character string direction A corresponding to the waveform 62A generated at Step S31 and at each shifted position along the direction A, an average value of the pixel integration value is calculated within the shifted scan section. Thus, the calculated average values are shown in a waveform 62C shown in FIG. 9B.

At Step S33, at each pixel position in the character string direction A, the waveform data 62C as the moving average value data is subtracted from the waveform data 62A as the projection data. Then, the calculated evaluation data subtracting the moving average value data from the projection data is normalized at Step S34. The normalizing process is the same as described above at Step S12. The third method to achieve the normalizing process adopts the evaluation value subtracting the moving average value data from the projection data as the pixel value integration evaluation value. When it is adopted the third method, the shading effect caused by shading and variations of light intensity occurring in the captured image can be removed and then it can be adjusted to provide a clear difference between the pixel value integration evaluation values of the character area and the background area.

Back to the flowchart shown in FIG. 4, at Step S4, the image-processing unit 13 calculates the pixel value variance evaluation value. The calculated pixel value variance evaluation values are shown as a waveform data 63 shown in FIG. 3C. In this embodiment of the present invention, as described above, as a method for calculating the pixel value variance evaluation value, one of four methods or a combination of these is adopted.

Figure 10:
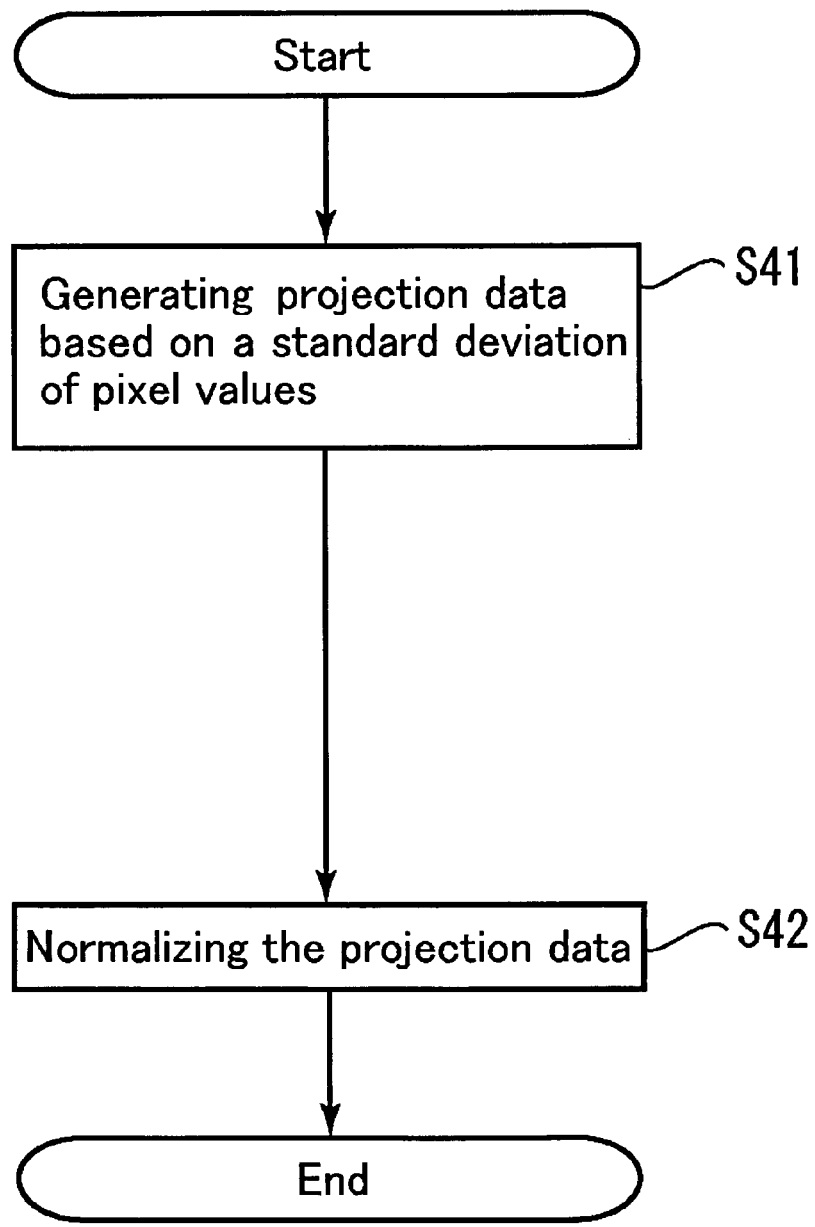
FIG. 10 is a flowchart showing a first embodiment for calculating the pixel value variance evaluation value.

A first method for calculating the pixel value variance evaluation value will be explained with reference to FIG. 10. At Step S41, projection data is generated based on a standard deviation of the pixel values corresponding to each pixel position along the character extracting direction B. Namely, as shown in FIG. 11, at Step S42, the standard deviation of the pixel string along the character extracting direction B at each pixel position (coordinate position) is calculated in the character string direction A. Thus, the pixel value variance evaluation value at each pixel is based on the calculated standard deviation at each pixel position in the direction A. Further, the generated projection data is normalized. The normalizing process is a process to adjust a range of the evaluation value so as to match the maximum value of the calculated pixel value variance evaluation values with a predetermined maximum value. The first method for calculating the pixel value variance evaluation value is a method for adopting the standard deviation of the pixel string along the character extracting direction B as the pixel value variance evaluation value.

FIG. 12 is a flowchart indicating a second method for calculating the pixel value variance evaluation value. At Step S51, a differential image is generated from the original captured image along the character extracting direction B. Namely, as shown in FIG. 13, at each pixel position in the character string direction A, the differential image corresponding to pixel string along the character extracting direction B is generated. In the other words, the edge image is generated corresponding to each pixel string along the character extracting direction B.

At Step S52, a standard deviation along the character extracting direction B is generated based on the differential image generated at Step S51, and then projection data is generated based on the standard deviation. Namely, the standard deviation corresponding to the pixel string of the differential image at each pixel position in the character string direction A is calculated. Then, the calculated projection data is normalized at Step S53. The normalizing process is the same as Step S42. The second method for calculating the pixel value variance evaluation value adopts the standard deviation of the differential image as the pixel value variance evaluation value. In the other words, to adopt the second method, a mixed degree of a part having a change as an image and a part having no change as the image is adopted to the pixel value variance evaluation value.

FIG. 14 is a flowchart indicating a third method for calculating the pixel value variance evaluation value. At Step S61, a differential image is generated from the image including the character string. At Step S51 of the above-mentioned second method, the differential image is generated along the character extracting direction B. However, at this Step S61 for making a differential image, the differential images are generated by Sobel filters corresponding to the directions A and B. Namely, as shown in FIG. 15, two differential images corresponding to A and B directions are generated based on the image including the character string.

At Step S62, the generated differential image at Step S61 is differentiated again along the character extracting direction B and a standard deviation is calculated based on a second-order differential image and also projection data is calculated based the standard deviation. Namely, as shown in FIG. 15, at each pixel position in the character string direction, a second-order differential image is generated and the standard deviation corresponding to the image string of second-order differential image is calculated. Then, the calculated projection data is normalized at Step S63. The normalizing process is the same as Step S42. The third method for calculating the pixel value variance evaluation value adopts the standard deviation of the second-order differential image as the pixel value variance evaluation value. In the other words, to adopt the second method, a mixed degree of a part having a change as an image and a part having no change as the image is adopted to the pixel value variance evaluation value. Further, since the standard deviation based on second-order differential image is adopted as the variance evaluation value, it is able to generate a plurality of variance (changing) corresponding to one local changing to some pixel values and it is able to maximize the variance (changing) of the image for evaluating easily.

FIG. 16 is a flowchart indicating a fourth method. At Step S71, at least two types of the projection data are added corresponding to the pixel value variance evaluation values among the first, the second and third pixel value variance evaluations. Namely, in this fourth method, at least two types are added or all of the types among the first method for calculating the variance evaluation value described in FIG. 10, the second method for calculating the variance evaluation value described in FIG. 12 and the third method for calculating the variance evaluation value described in FIG. 14, are used. Further, prior to adding, some weighting to each of the adding candidates of the variance evaluation values is preferred. Then, at least two types of the variances among the first, second and third variance evaluation values are preselected to calculate a combined variance evaluation value and then the combined variance evaluation value is normalized at Step S72. The fourth method for calculating the pixel value variance evaluation value adopts the combined variance evaluation value as the pixel value variance evaluation value. According to the fourth method, it is able to execute an overall variance evaluation by utilizing each characteristic corresponding to a change of the image, a change of the differential image and a second-order differential image. In the case of selecting at least two types of the variance evaluation values among the first, second and third types of the variance evaluation values and also adjusting the ratio between the selected variance evaluation values, the user can decide such a selection by viewing the monitor showing the result of the combination with the adjusted ratio shown in FIG. 3D.

Back to the flowchart shown in FIG. 4, at Step S3, the image-processing unit 13 calculates the pixel value integration evaluation value, and then at Step S4, the image-processing unit 13 calculates the pixel value variance evaluation value. At Step S5, at each pixel position in the character string direction A, the total evaluation value is calculated by combining the pixel value integration evaluation value with the pixel value variance. A combined waveform data 64 indicating the total evaluation value calculated at each pixel position in the character string direction A is shown in FIG. 3D.

A method of the combination of these values is simply to add the pixel value integration evaluation value to the pixel value variance evaluation value or to combine these values by adjusting a ratio between these values such as an assigning weight between these values.

At Step S6, the image-processing unit 13 decides the character extracting positions with a threshold 65. The threshold 65 is set initially as a predetermined value in the image-processing unit 13 or the user can set a desired value as the threshold by using the operation unit 14 as described below.

At Step S7, the image processing unit 13 outputs the character extracting positions based on the set threshold 65. Namely, as shown in FIG. 3D, the combined waveform data 64 is compared with the threshold 65 and areas having the total evaluation values above the threshold 65 from the combined waveform data 64 are extracted. After the character area is extracted, the image processing unit 13 provides character recognition processing to the extracted character area.

Figure 19:
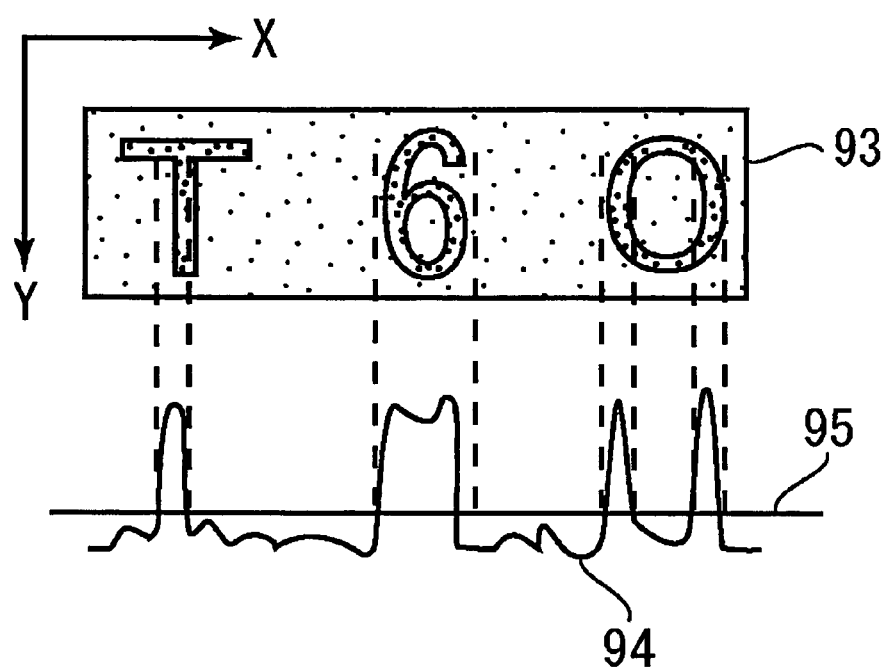
FIG. 19 is a diagram showing a problem in the conventional character extracting process.

Thus, according to this embodiment of the present invention, the character area is determined based on the combined the pixel value integration evaluation value with the pixel value variance evaluation value. For example, when the character area is determined by the pixel value integration evaluation value only, as shown in FIG. 19, there is a possibility not to recognize some area having a relatively smaller pixel value integration value as the character area. However, in addition to the pixel value integration evaluation value, to add the pixel value variance evaluation value as a determination element of the character area, can push up the total evaluation value corresponding to the area having a relatively smaller pixel value integration value. Accordingly, it is possible to extract each character with accuracy.

In the case of an example shown in FIG. 3A through FIG. 3D, only a transverse line part of the "T" character has a relatively small pixel value integration value than the other part of the "T" character as shown to the waveform data 62. However, even the only transverse line part of "T" character has a relatively larger pixel value variance evaluation value as compared with the background as shown to the waveform data 63. Therefore, by combining the pixel value integration value with the pixel value variance evaluation value, as shown to the waveform data 64, it can push up the evaluation value corresponding to the whole character area. That is the same for the "0" character area. According to the image processing system of the embodiment of the present invention, even when there is a character having a relatively lower contrast or a background having random noise, it is possible to provide a character extraction with accuracy based on the above-mentioned functions.

User Interface

Figure 17:
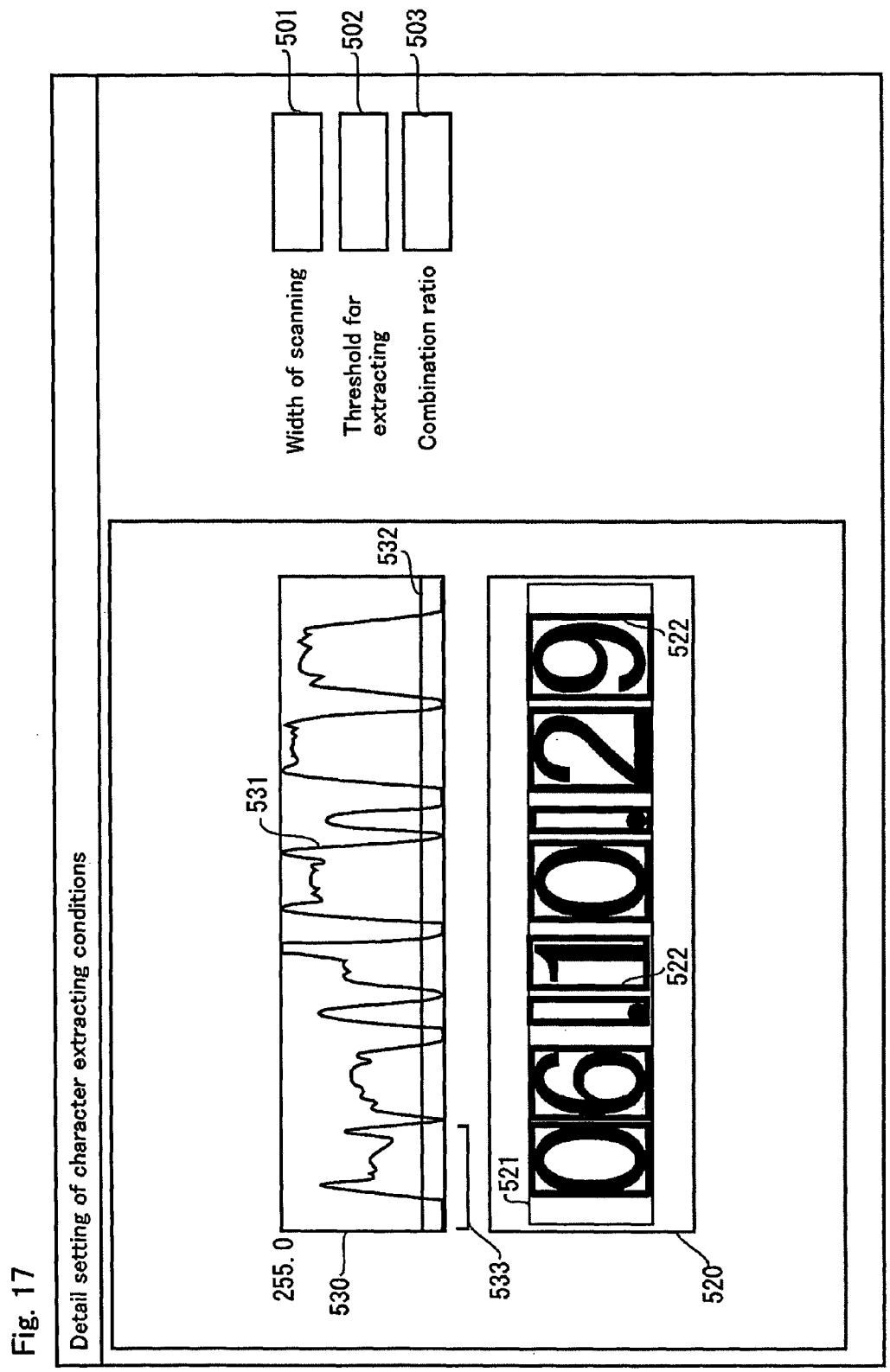
FIG. 17 is a diagram showing a user interface of the character extracting process.
Figure 18:
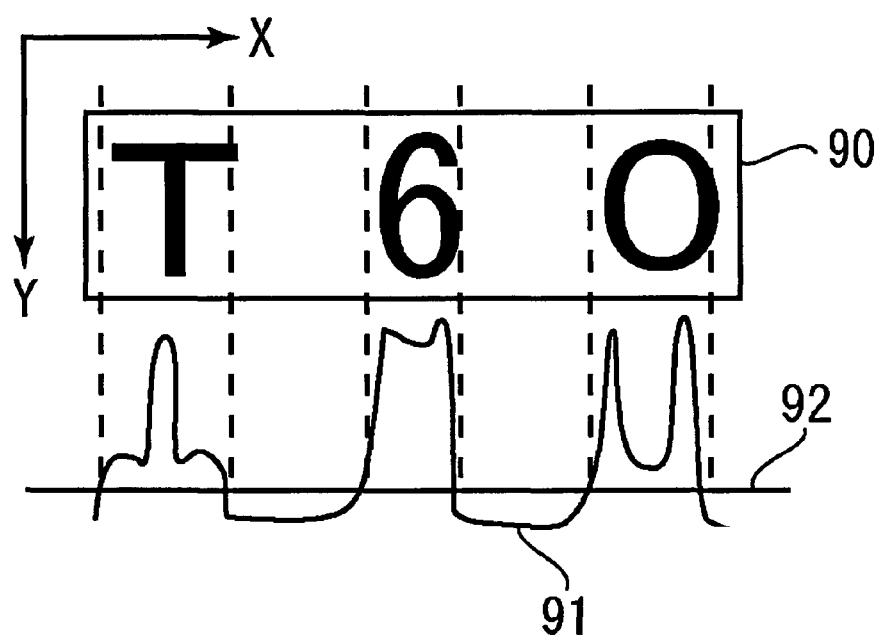
FIG. 18 is a diagram showing a conventional character extracting process.

FIG. 17 is a diagram showing a setting condition confirmation view displayed on the monitor 3 as a user interface of the character extracting process, in the case of executing the character extracting process. The view has setting parts 501 through 503 disposed at the right portion of the view and an image processing area 520 and a waveform display part 530 disposed in a center portion of the view. The user can adjust the character extracting process by modifying each parameter of the setting parts 501 through 503 by using the operation unit 14 and referring to the image displayed on the image processing area 520 and a waveform 531 displayed on the waveform display part 530. A rectangular shaped window 521 disposed in the image processing area 520 indicates the character string extracting area.

Further, a positioning relationship between the image process area 520 and the waveform display part 530 on the setting confirmation screen 5, is determined that each character displayed on the image process area 520 is in the same position of a part of the waveform displayed on the display part 530 corresponding to the character displayed on the image process area in the line extracting direction A.

Accordingly, it is easy to understand the positioning relationship between specified character displayed on the image process area 520 and a part of the waveform displayed on the waveform display part 530 corresponding to the specified character displayed on the image process area 520. In this embodiment, the waveform display part 530 is disposed at an upper part of the setting confirmation screen 5 and the image process area 520 is disposed at a lower part of the setting confirmation screen 5. However, to obtain the above-mentioned effect, it is also preferred that the waveform display part 530 is disposed in the lower part of the setting confirmation screen 5 and the image process area 520 is disposed in the upper part of the setting confirmation screen 5.

The image processing area 520 shows the image including characters to be processed. The captured image includes the medium having printed the specified date "06.10.29" as shown in FIG. 17. A rectangular shaped window 522 in the image processing area 520 surrounds each extracted character area. As shown in the figure, each character like "0", "6" and the other characters are surrounded by the rectangular shaped window 522 and then, the user can monitor a relative relationship between each rectangular shaped window 522 and each character area disposed in each rectangular shaped window 522.

The waveform display part 530 shows a combined waveform data 531 corresponding to the combined waveform 64 shown in FIG. 3D. Namely, the combined waveform with the pixel value integration evaluation value and the pixel value variance evaluation value are displayed. Further, a threshold 532 shows as it is put on the combined waveform data 531. To see this display, the user can realize a relationship between the combined waveform and the threshold and also can realize which areas are extracted as the character areas with a relationship to the threshold 532.

Furthermore, at a lower portion of the waveform display part 530, a scan section 533 is displayed. The scan section 533 is the same as the scan sections 621 and 622 described above in FIG. 7 and FIG. 9. Namely, as described above in FIG. 7 and FIG. 9, the moving minimum value and the moving average value are calculated by shifting the scan sections 621 and 622. Since the scan section 533 is displayed on the waveform display part 530, it is easy to understand the relationship between the scan width, the image and the waveform 531. The user can modify the width of the scan section 533 by inputting a setting value into a setting part 501. If the user does not input any value into the setting part 501, the image-processing unit 3 adopts a predetermined value as the scan section width.

When the width of the scan section 533 is changed, the values corresponding to the moving minimum value and the moving average value are changed and the final combined waveform is changed too. Then, the waveform display part 530 shows a revised combined waveform data 531 in real time based on changing the width of the scan section 533. Accordingly, the user can modify the width of the scan section 533 and view the combined waveform on the monitor.

Further, the user can modify the value of the threshold 532 for extracting the character by inputting a desired value in a setting part 502. When the threshold 532 is modified by the user, the extracting position of the character and the position and size of each rectangular shaped window 522 are modified. Thus, the user can confirm the extracting position of each character to be extracted by modifying the threshold value 532.

Furthermore, as described above, the width of the scan section 533 can be set by inputting a desired value into the setting part 501. However, if the user does not modify the width of the scan section, the image-processing unit 3 provides a predetermined value as the width of the scan section 533. It is preferred that the predetermined value as the width of the scan section 533 is a little bit larger than the width of the character to be extracted. Therefore, the predetermined value is fixed by experiment or decided based on the height of the rectangular shape window 521 surrounding the character string automatically. As described above, at Step S2, the captured image is extracted as the character string. Therefore, the width of the scan section 533 is calculated by multiplying the height of the rectangular shape window 521 by a specified ratio. The specified ratio will be decided by experiment. Thus, even when the character captured by the camera 2 is larger or smaller, it can be set an appropriate width of the scan section corresponding automatically to the captured size of the character. Furthermore, as another embodiment for fixing the width of the scan section 533, the above-mentioned specified ratio can be set manually to input a desired value into a setting part (not shown) by the user, when a ratio of the height to the width of the character to be extracted has already been known based on a product or goods as an object for capturing the image.

Furthermore, it is preferred that each shifting amount of the scan section along to the first direction A is the same as the pixel size (each pixel) to obtain an accurate value. However, it is also possible to determine the shift amount by manually inputting a desired shift amount by the user under balancing efficiency and accuracy of the scan.

The user can also adjust the combination ratio between the pixel value integration evaluation value and the pixel value variance evaluation value by setting the combination ratio in a setting part 503. Then, when the user modifies the combination ratio, the combined waveform 531 is changed. The waveform display part 530 can provide the changing situation of the combined waveform data 531 on a real time basis. Further, since the extracting position of the character is also changed, the position and the size of the rectangular shape window 522 displayed on the image processing area 520 is changed. Therefore, the user can confirm the shape of the combined waveform and the extracting position of the character by modifying the combination ratio between the pixel value integration evaluation value and the pixel value variance evaluation value.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

This application is based on Japanese Patent Application Japanese Patent Application No. 2006-248368, filed on Sep. 13, 2006 and Japanese Patent Application No. 2007-218699, filed on Aug. 24, 2007, the contents of which are incorporated hereinto by reference.

What is claimed is:

1. An apparatus for extracting each character from a character string having a plurality of characters arranged in a first direction and included in an image and including a non-transitory computer readable medium, comprising:
   a) an integrating means for integrating pixel values along a second direction orthogonal to said first direction at each of all coordinate positions in the said direction of said image;
   b) a calculating means for calculating a standard deviation value of values related to pixel values along said second direction at each of said all coordinate positions;
   c) a combining means for combining said integrated pixel value of said integrating means with said standard deviation value of said calculating means at each of said all coordinate positions;
   d) a setting means for setting a threshold; and
   e) a determining means for determining a part of said all coordinate position having said combined value of said combining means higher than said threshold of said setting means and recognizing said part having said combined value higher than said threshold of said setting means as a character area to be extracted.

2. The character extracting apparatus according to claim 1, wherein
   said integrating means for integrating pixel values comprising:
   a first integrating means for integrating said pixel values along said second direction at each of said all coordinate positions in said first direction of said image;
   a moving average value obtaining means for obtaining a moving average value based on said integrated pixel value of said first integrating means along said first direction at each of said all coordinate positions in said first direction of the said image; and
   a subtracting means for subtracting said moving average value of said moving average value obtaining means from said integrated pixel value of said first integrating means at each of said all coordinate positions in said first direction of said image.

3. The character extracting apparatus according to claim 2, further comprising:
   a width setting means for setting a width of a section to calculate said moving average value based on said integrated values within said section at each of said all coordinate positions in the first direction of the image; and
   a display means for displaying a waveform based on said combined value of said combining means with setting said width of said section.

4. The character extracting apparatus according to claim 3, wherein
   said display means for displaying said waveform with a mark indicating a position and said width of said section.

5. The character extracting apparatus according to claim 3, further comprising:
   a character string extracting means for extracting said character string having a plurality of characters from said image.

6. The character extracting apparatus according to claim 5, further comprising:
   a width setting means for automatically setting a width of a section based on a height of said character extracted by said character string extracting means and a predetermined ratio of said width to said height of said character, wherein said section for calculating said moving average value based on said integrated pixel values within said section at each of said all coordinate positions in said first direction of said image.

7. The character extracting apparatus according to claim 2, further comprising:
   a character string extracting means for extracting said character string having a plurality of characters from said image.

8. The character extracting apparatus according to claim 1, wherein
   said integrating means for integrating pixel values comprising:
   a first integrating means for integrating said pixel values along said second direction at each of said all coordinate positions in the said first direction of said image;
   a moving minimum value obtaining means for obtaining a moving minimum value based on said integrated pixel value of said first integrating means along said first direction at each of said all coordinate positions in said first direction of said image; and
   a subtracting means for subtracting said moving minimum value of said moving minimum value obtaining means from said integrated pixel value of said first integrating means at each of said all coordinate positions in said first direction of said image.

9. The character extracting apparatus according to claim 3, further comprising:
   a width setting means for setting a width of a section to calculate said moving minimum value based on said integrated values within said section at each of said all coordinate positions in the first direction of said image; and
   a display means for displaying a waveform based on said combined value of said combining means corresponding to setting said width of said section.

10. The character extracting apparatus according to claim 9, wherein
    said display means for displaying said waveform with a mark indicating a position and said width of said section.

11. The character extracting apparatus according to claim 9, further comprising:
    a character string extracting means for extracting said character string having a plurality of characters from said image.

12. The character extracting apparatus according to claim 11, further comprising:
    a width setting means for automatically setting a width of a section based on a height of said character extracted by said character string extracting means and a predetermined ratio of said width to said height of said character, wherein said section for calculating said moving minimum value based on said integrated pixel values within said section at each of said all coordinate positions in said first direction of said image.

13. The character extracting apparatus according to claim 1, wherein
said calculating means for calculating a standard deviation value of said pixel values along said second direction at each of said all coordinate positions.

14. The character extracting apparatus according to claim 1, wherein
said calculating means for calculating a standard deviation value of differential values of said pixel values along said second direction at each of said all coordinate positions.

15. The character extracting apparatus according to claim 1, wherein
said calculating means for calculating a standard deviation value of second-order differential values of said pixel values along said second direction at each of said all coordinate positions.

16. The character extracting apparatus according to claim 1, wherein
said calculating means for calculating a first standard deviation value of said pixel values along said second direction at each of said all coordinate positions, a second standard deviation value of differential values of said pixel values along said second direction at each of said all coordinate positions and a third standard deviation value of second-order differential values of said pixel values along said second direction at each of said all coordinate positions and combining at least two among said first, second and third standard deviations.

17. The character extracting apparatus according to claim 1, further comprising:
a character string extracting means for extracting said character string having a plurality of characters from said image.

18. The character extracting apparatus according to claim 1, further comprising:
a combination ratio adjusting means for adjusting a combination ratio between said combined integrated pixel value of said integrating means and said combined standard deviation value of said calculating means by said combining means.

19. The character extracting apparatus according to claim 18, further comprising:
a display means for displaying a waveform based on said combined value of said combining means corresponding to adjusting said combination ratio adjusting means.

20. A non-transitory computer readable medium including a program for extracting each character from a character string having a plurality of characters arranged in a first direction and included in an image, comprising:
a) an integrating step for integrating pixel values along a second direction orthogonal to said first direction at each of all coordinate positions in said first direction of said image;
b) a calculating step for calculating a standard deviation value of values related to pixel values along said second direction at each of said all coordinate positions;
c) a combining step for combining said integrated pixel value of said integrating step with said standard deviation value of said calculating step at each of said all coordinate positions; and
e) a determining step for determining a part of said all coordinate position having said combined value of said combining step higher than a predetermined threshold and recognizing said part having said combined value higher than said threshold as a character area to be extracted.

21. A non-transitory computer readable medium including a program for extracting each character from a character string having a plurality of characters arranged in a first direction and included in an image, the program for making a computer function as:
a) an integrating means for integrating pixel values along a second direction orthogonal to said first direction at each of all coordinate positions in said first direction of said image;
b) a calculating means for calculating a standard deviation value of values related to pixel values along said second direction at each of said all coordinate positions;
c) a combining means for combining said integrated pixel value of said integrating means with said standard deviation value of said calculating means at each of said all coordinate positions;
d) a setting means for setting a threshold; and
e) a determining means for determining a part of said all coordinate position having said combined value of said combining means higher than said threshold of said setting means and recognizing said part having said combined value higher than said threshold of said setting means as a character area to be extracted.

* * * * *